United States Patent
Zhang et al.

(10) Patent No.: US 11,782,694 B2
(45) Date of Patent: Oct. 10, 2023

(54) PIPELINE ROLLING UPDATE

(71) Applicant: Dell Products L.P., Round Rock, TX (US)

(72) Inventors: Zhuo Zhang, Shanghai (CN); Lixia Hu, Shanghai (CN); Kai Zhou, Shanghai (CN); Qian Yang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 29 days.

(21) Appl. No.: 17/482,033

(22) Filed: Sep. 22, 2021

(65) Prior Publication Data

US 2022/0004380 A1 Jan. 6, 2022

Related U.S. Application Data

(63) Continuation of application No. 16/917,557, filed on Jun. 30, 2020, now Pat. No. 11,157,263.

(30) Foreign Application Priority Data

Jun. 15, 2020 (CN) .......................... 202010541459.8

(51) Int. Cl.
  *G06F 9/445* (2018.01)
  *G06F 8/65* (2018.01)
  *G06F 9/455* (2018.01)

(52) U.S. Cl.
  CPC ............ *G06F 8/65* (2013.01); *G06F 9/45558* (2013.01); *G06F 2009/4557* (2013.01); *G06F 2009/45587* (2013.01)

(58) Field of Classification Search
  CPC .................. G06F 8/65; G06F 9/45558; G06F 2009/4557; G06F 2009/45587
  USPC .......................................... 717/120–122, 168
  See application file for complete search history.

(56) References Cited

U.S. PATENT DOCUMENTS

| 8,843,624 B2 | 9/2014 | Britsch et al. | |
| 2016/0013992 A1* | 1/2016 | Reddy | H04L 47/822 709/224 |
| 2017/0329546 A1* | 11/2017 | Chen | G06F 3/0653 |

* cited by examiner

*Primary Examiner* — Chuck O Kendall
(74) *Attorney, Agent, or Firm* — Jackson Walker L.L.P.

(57) ABSTRACT

An information handling system may include at least one processor; and a non-transitory memory coupled to the at least one processor. The information handling system may be configured to upgrade a plurality of hosts of an information handling system cluster by: receiving information regarding fault domains of the cluster, such that each host of the plurality of hosts is a member of exactly one fault domain; and for each fault domain: causing all hosts of the fault domain to enter a protect mode in which new virtual machines cannot be created or accepted for migration; causing hosts to enter a maintenance mode in which any existing virtual machines are migrated away from the hosts; and causing the hosts to perform the upgrade, wherein a plurality of hosts are configured to perform the upgrade simultaneously.

20 Claims, 3 Drawing Sheets

PIPELINE ROLLING UPDATE

CROSS-REFERENCE TO RELATED APPLICATIONS

The present application is a continuation of U.S. patent application Ser. No. 16/917,557, filed Jun. 30, 2020, which claims priority to Chinese Patent Application No. 202010541459.8, filed Jun. 15, 2020. All of these applications are hereby incorporated by reference herein in their entireties.

TECHNICAL FIELD

The present disclosure relates in general to information handling systems, and more particularly to accelerating update events in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers.

The use of rolling updates allows an HCI cluster to be upgraded online and without service interruptions. During such an upgrade, typically each node of a cluster may be upgraded (e.g., with upgrade components such as firmwares, drivers, application software, etc.) in turn until the entire cluster reaches the same system version.

Owing to the close coupling of virtualized computing and software-defined storage on a single node, such an upgrade typically can be performed only on one node (or at most two nodes) at a time to ensure that the number of hosts being maintained cannot exceed the level of failures to tolerate (FTT, typically FTT=1). As a result, the online upgrade of a cluster can become a very time-consuming task. It can also impact the system load capacity and increase the risk of downtime.

This disclosure thus provides techniques for accelerating the update speed with several cross fault-domain migration policies in an HCI cluster. With this methodology, the time complexity for updating a whole cluster in Big-O notation may be reduced from O(Number of Hosts) to O(Number of Fault Domains).

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with upgrades of clusters of information handling systems may be reduced or eliminated.

In accordance with embodiments of the present disclosure, an information handling system may include at least one processor; and a non-transitory memory coupled to the at least one processor. The information handling system may be configured to upgrade a plurality of hosts of an information handling system cluster by: receiving information regarding fault domains of the cluster, such that each host of the plurality of hosts is a member of exactly one fault domain; and for each fault domain: causing all hosts of the fault domain to enter a protect mode in which new virtual machines cannot be created or accepted for migration; causing hosts to enter a maintenance mode in which any existing virtual machines are migrated away from the hosts; and causing the hosts to perform the upgrade, wherein a plurality of hosts are configured to perform the upgrade simultaneously.

In accordance with these and other embodiments of the present disclosure, a method may include a management information handling system receiving information regarding fault domains of an information handling system cluster comprising a plurality of hosts, such that each host of the plurality of hosts is a member of exactly one fault domain; and for each fault domain, the management information handling system: causing all hosts of the fault domain to enter a protect mode in which new virtual machines cannot be created or accepted for migration; causing hosts to enter a maintenance mode in which any existing virtual machines are migrated away from the hosts; and causing the hosts to perform the upgrade, wherein a plurality of hosts are configured to perform the upgrade simultaneously.

In accordance with these and other embodiments of the present disclosure, an article of manufacture may include a non-transitory, computer-readable medium having computer-executable code thereon that is executable by a processor of an information handling system for managing an upgrade of an information handling system cluster including a plurality of host systems by: receiving information regarding fault domains of the cluster, such that each host of the plurality of hosts is a member of exactly one fault domain; and for each fault domain: causing all hosts of the fault domain to enter a protect mode in which new virtual machines cannot be created or accepted for migration; causing hosts to enter a maintenance mode in which any existing virtual machines are migrated away from the hosts; and causing the hosts to perform the upgrade, wherein a plurality of hosts are configured to perform the upgrade simultaneously.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
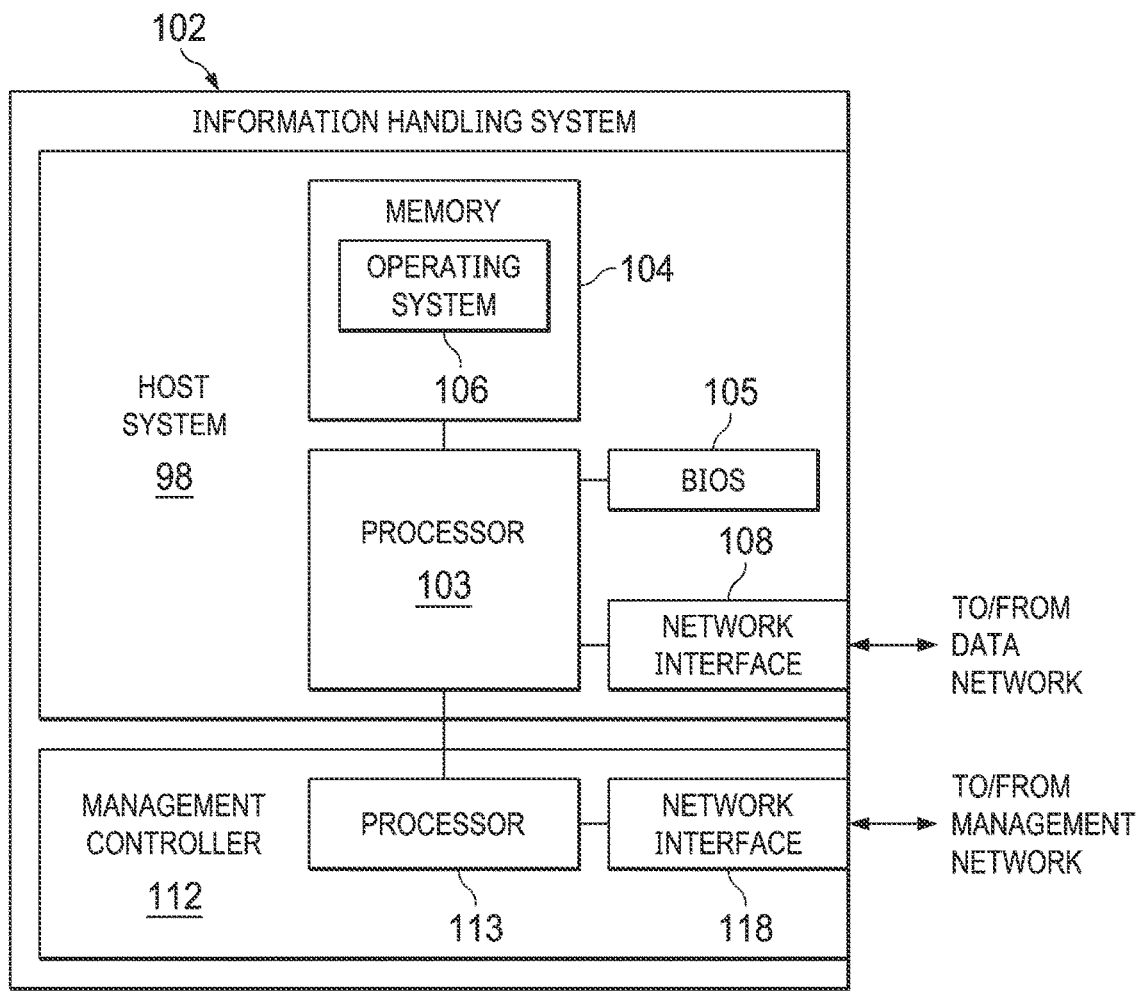
FIG. 1 illustrates a block diagram of an example information handling system, in accordance with embodiments of the present disclosure.
Figure 2:
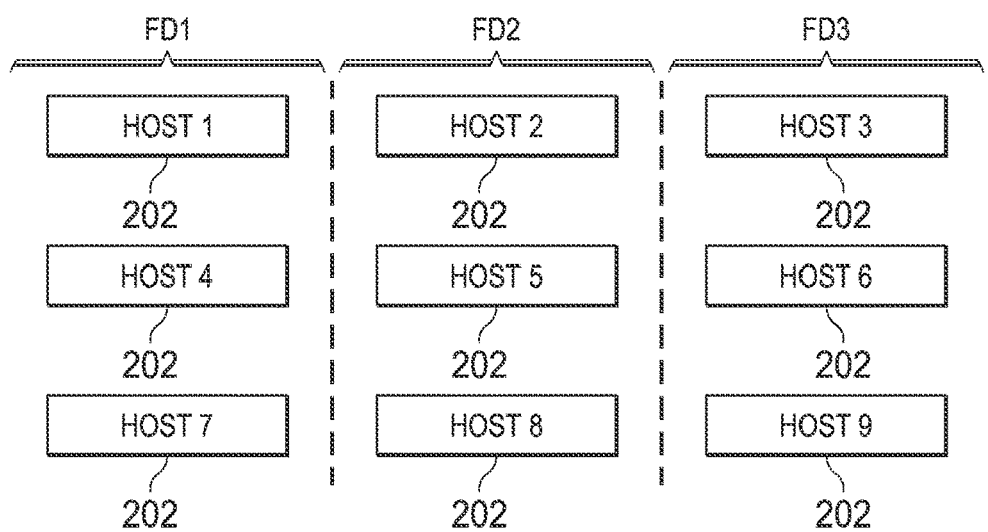
FIG. 2 illustrates a block diagram of fault domains, in accordance with embodiments of the present disclosure.
Figure 3:
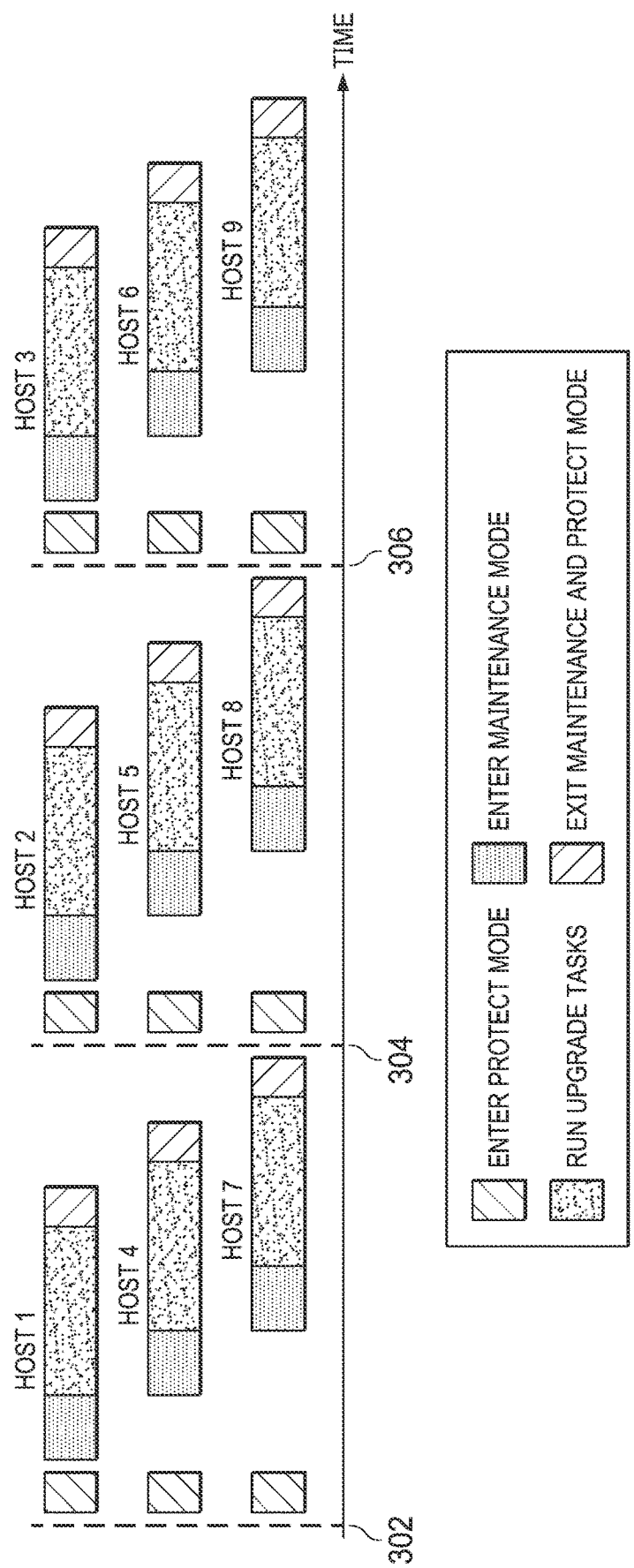
FIG. 3 illustrates an example method, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to reduce the amount of time required for performing an online rolling upgrade of a cluster of information handling systems.

Accordingly, "fault domains" may be determined within the cluster to allow update procedures to be more efficiently pipelined. A fault domain is a set of hosts that share a single point of failure. For example, if a failure of a single power line or a single network connection can cause a group of hosts to fail, then they may be considered to be in the same fault domain. In this way, a cluster may be protected from a certain level failure such as loss of power or connectivity.

Based on this principal, it is possible to update multiple hosts at the same time within a fault domain. A general HCI cluster may typically include at least three fault domains to support FTT=1, with each fault domain consisting of one or more hosts. Fault domain definitions may acknowledge physical hardware constructs that might represent a potential zone of failure, for example, an individual computing rack enclosure.

As an example, FIG. 2 shows a block diagram of nine hosts 202 that have been partitioned into three fault domains.

Currently, rolling update procedures may require a host to enter a "maintenance mode" before being updated. Any virtual machines that are running on a host entering maintenance mode are either migrated to another host or shut down. For purposes of this disclosure, a "protect mode" may also be implemented to allow multiple hosts to be upgraded in a pipelined fashion. Protect mode may allow migration of virtual machines in a more efficient way.

To be specific, in maintenance mode, the hypervisor service and the storage service are both stopped on the host. In protect mode, in contrast, the hypervisor service and the storage service may both keep running, but no new virtual machines are allowed to be created on the host or migrated to the host. Thus protect mode may be seen as a more "lightweight" version of the restrictions of maintenance mode. Table 1 below provides details of these two modes.

TABLE 1

| | Maintenance Mode | Protect Mode |
| --- | --- | --- |
| Hypervisor service | Stopped | Running |
| Storage service | Stopped | Running |
| Trigger VM migration? | Yes | No |
| Trigger data migration? | Conditional | No |
| VM migration source | N/A | Allow |
| VM migration destination | Deny | Deny |

When the update procedure begins, all hosts within a first fault domain may be put into protect mode. Then, a host may enter maintenance mode to migrate all virtual machines running on it to other fault domain(s). When the maintenance mode is entered by a particular host, the update tasks for that host and the entry into maintenance mode on the next host can be performed at the same time. After the update process is completed on a host, it may exit both the maintenance mode and the protect mode. This may be repeated on the remaining hosts within the fault domain, and then the entire procedure may be repeated on the remaining fault domains, in order to update the whole cluster to a higher version.

Turning now to FIG. 3, a flow chart is shown of an example method 300 for updating a cluster of information handling systems, in accordance with some embodiments. As in FIG. 2, hosts 1, 4, and 7 are within fault domain 1. Hosts 2, 5, and 8 are within fault domain 2. Hosts 3, 6, and 9 are within fault domain 3.

At step 302, the update procedure for fault domain 1 begins. All three of the hosts in fault domain 1 first enter protect mode. The hypervisor service and the storage service may continue running, but no new virtual machines are allowed to be created on or migrated to these three hosts.

Next, host 1 enters maintenance mode. The hypervisor service and the storage service are both stopped on host 1, and its virtual machines are migrated away. In particular, they may be migrated to hosts within some other fault domain, because the other hosts within fault domain 1 are already in protect mode and thus cannot accept such a migration.

Then host 1 begins its upgrade tasks while host 4 enters maintenance mode. Similarly, virtual machines are migrated from host 4 to some other fault domain.

Then host 4 begins its upgrade tasks while host 7 enters maintenance mode. Virtual machines are migrated from host 7 to some other fault domain.

When each host finishes its upgrade tasks, it respectively exits both the protect mode and the maintenance mode. At the end of step 302, hosts 1, 4 and 7 are upgraded and available to receive migrated virtual machines.

At step 304 a similar process takes place within fault domain 2. At step 306, a similar process takes place within fault domain 3.

As can be seen from FIG. 3, a significant amount of the upgrade tasks are able to take place in parallel instead of being forced to take place serially.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

As depicted in FIG. 3, each host may proceed through four stages during the upgrade procedure. In the first stage, protect mode is entered. In the second stage, maintenance mode is entered. In the third stage, the upgrade tasks are run. And in the fourth stage, both maintenance and protect mode are exited.

In some embodiments, the entry into maintenance mode may be considered the critical path of the upgrade process, because only one node of the entire cluster can execute "enter maintenance mode" simultaneously. If insufficient resources are present to migrate all VMs to other fault domains, then the upgrade pipeline may stall until one of the preceding hosts finishes stage 4 (exit maintenance and protect mode).

Figure 4:
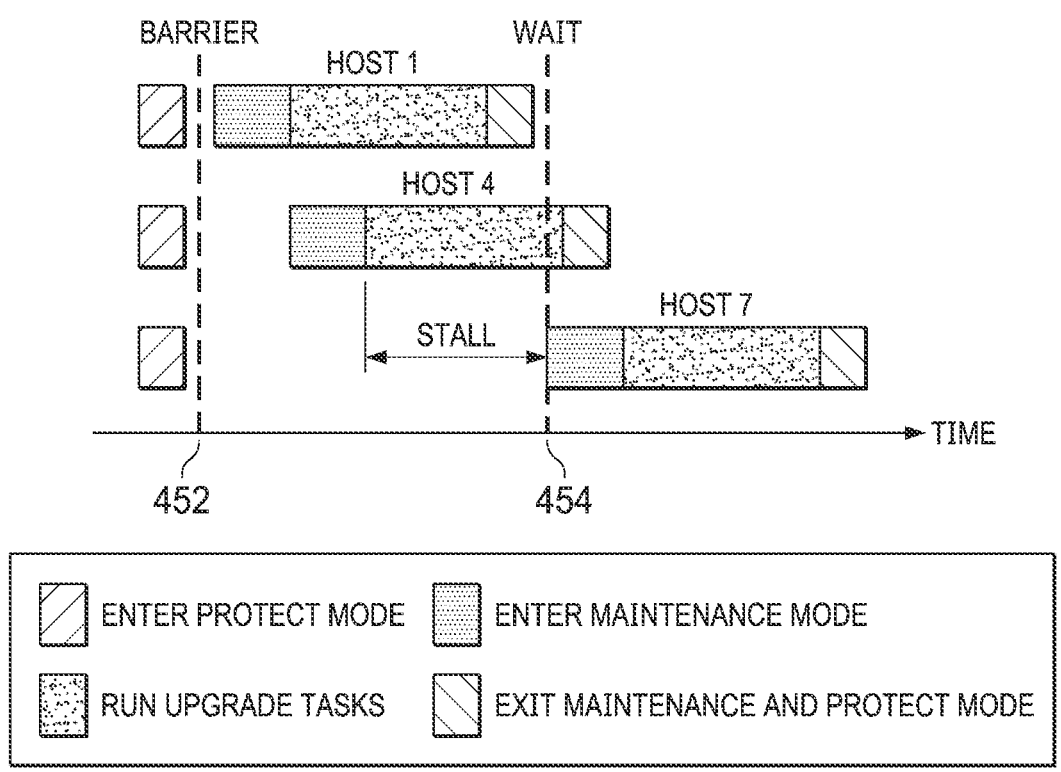
FIG. 4 illustrates an example method, in accordance with embodiments of the present disclosure.

FIG. 4 depicts a portion of an example that is similar to FIG. 3, but in which insufficient resources are initially available to migrate VMs from Host 7. Thus FIG. 4 shows an example of how the entire workflow can stall in such a situation. In particular, FIG. 4 shows barrier 452 which is used (as discussed below) to ensure that all hosts are in protect mode. Further, because of the stall, Host 7 must wait until time 454 before entering maintenance mode.

The implementation of some embodiments may rely on three synchronization primitives to control the upgrade workflow: pm_barrier is a barrier object to ensure that all hosts are already in protect mode; mm_mutex is a mutex which facilitates exclusive operation of "enter maintenance mode"; and exit_cv is a conditional variable which can be used to wait the exiting operation on preceding hosts. An example listing of pseudo code for each node is illustrated as follows:

```
do_stage_1 ( );
pm_barrier.await( );
while (not enough resources for migration) {
    exit_cv.wait( );
}
mm_mutex.lock( );
do_stage_2 ( );
mm_mutex.unlock( );
do_stage_3 ( );
do_stage_4 ( );
exit_cv.notify( );
```

Accordingly, the use of "protect mode" as described in this disclosure allows the migration of virtual machines in a more efficient way. This may provide a mechanism to update hosts in parallel with a multi-phase pipeline model, as illustrated in FIG. 3. Further, a mechanism is provided to schedule the rolling update workflow in multiple phases by means of fault domains (e.g., storage fault domains).

These features may provide significant time savings in cluster upgrades, especially for a large-scale cluster. The maintenance window may be correspondingly shortened, and the risk of downtime reduced. Further, unnecessary virtual machine migration overhead during upgrade may be reduced. The scheduling and management of the upgrade procedure may be managed via a management system. In some embodiments, the management system may be an element of the cluster, while in other embodiments it may be a separate system. In some embodiments, the management system may be a management controller such as management controller 112 discussed above. In other embodiments, the management system may be implemented on a host system rather than a management controller.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to upgrade a plurality of hosts of an information handling system cluster by:
   receiving information regarding fault domains of the cluster, such that each host of the plurality of hosts is a member of exactly one fault domain; and
   for each fault domain:
     causing hosts of the fault domain to enter a mode in which any existing virtual machines are migrated away from the hosts; and
     causing the hosts to perform the upgrade, wherein a plurality of hosts are configured to perform the upgrade simultaneously.

2. The information handling system of claim 1, wherein the information handling system is further configured to cause each host to exit the mode subsequent to completion of the upgrade.

3. The information handling system of claim 1, further configured to cause the hosts of the fault domain to enter a protect mode in which new virtual machines cannot be created or accepted for migration.

4. The information handling system of claim 1, wherein the fault domains each include an equal number of hosts.

5. The information handling system of claim 1, wherein the information handling system is a host of the cluster.

6. The information handling system of claim 1, wherein the information handling system is a management controller.

7. The information handling system of claim 1, wherein, at a particular time, a first host is configured to begin the upgrade and a second host is configured to enter the mode.

8. A method comprising:
   a management information handling system receiving information regarding fault domains of an information handling system cluster comprising a plurality of hosts, such that each host of the plurality of hosts is a member of exactly one fault domain; and
   for each fault domain, the management information handling system:
     causing hosts to enter a mode in which any existing virtual machines are migrated away from the hosts; and
     causing the hosts to perform the upgrade, wherein a plurality of hosts are configured to perform the upgrade simultaneously.

9. The method of claim 8, further comprising causing each host to exit the mode subsequent to completion of the upgrade.

10. The method of claim 8, further comprising causing the hosts of the fault domain to enter a protect mode in which new virtual machines cannot be created or accepted for migration.

11. The method of claim 8, wherein the fault domains each include an equal number of hosts.

12. The method of claim 8, wherein the management information handling system is a host of the cluster.

13. The method of claim 8, wherein, at a particular time, a first host begins the upgrade and a second host enters the mode.

14. An article of manufacture comprising a non-transitory, computer-readable medium having computer-executable code thereon that is executable by a processor of an information handling system for managing an upgrade of an information handling system cluster including a plurality of host systems by:
   receiving information regarding fault domains of the cluster, such that each host of the plurality of hosts is a member of exactly one fault domain; and
   for each fault domain:
     causing hosts to enter a mode in which any existing virtual machines are migrated away from the hosts; and
     causing the hosts to perform the upgrade, wherein a plurality of hosts are configured to perform the upgrade simultaneously.

15. The article of claim 14, wherein the code is further executable for:
   causing each host to exit the mode subsequent to completion of the upgrade.

16. The article of claim 14, wherein the code is further executable for causing the hosts of the fault domain to enter a protect mode in which new virtual machines cannot be created or accepted for migration.

17. The article of claim 14, wherein the fault domains each include an equal number of hosts.

18. The article of claim 14, wherein the information handling system is a host of the cluster.

19. The article of claim 14, wherein the information handling system is a management controller.

20. The article of claim 14, wherein, at a particular time, a first host is configured to begin the upgrade and a second host is configured to enter the mode.

* * * * *